(12) United States Patent
You et al.

(10) Patent No.: US 12,334,584 B2
(45) Date of Patent: Jun. 17, 2025

(54) BATTERY CELL, BATTERY, ELECTRIC APPARATUS, AND MANUFACTURING METHOD AND DEVICE OF BATTERY CELL

(71) Applicant: CONTEMPORARY AMPEREX TECHNOLOGY (HONG KONG) LIMITED, Hong Kong (CN)

(72) Inventors: Xingyan You, Ningde (CN); Wanqiu Meng, Ningde (CN); Baozhen Wu, Ningde (CN); Yiyang Wu, Ningde (CN); Yuwen Wang, Ningde (CN); Chan Liao, Ningde (CN); Yonghuang Ye, Ningde (CN)

(73) Assignee: Contemporary Amperex Technology (Hong Kong) Limited, Hong Kong (CN)

( * ) Notice: Subject to any disclaimer, the term of this patent is extended or adjusted under 35 U.S.C. 154(b) by 0 days.

(21) Appl. No.: 18/447,429

(22) Filed: Aug. 10, 2023

(65) Prior Publication Data
US 2023/0402708 A1  Dec. 14, 2023

Related U.S. Application Data

(63) Continuation of application No. PCT/CN2021/138931, filed on Dec. 16, 2021.

(51) Int. Cl.
*H01M 50/30* (2021.01)
*H01M 10/04* (2006.01)
*H01M 50/609* (2021.01)

(52) U.S. Cl.
CPC ..... *H01M 50/394* (2021.01); *H01M 10/0404* (2013.01); *H01M 10/049* (2013.01); *H01M 50/609* (2021.01)

(58) Field of Classification Search
CPC ............... H01M 10/445; H01M 10/52; H01M 10/6565; H01M 50/30; H01M 50/131;
(Continued)

(56) References Cited

U.S. PATENT DOCUMENTS 5,362,577 A * 11/1994 Pedicini ................ H01M 12/08
429/86
2012/0015218 A1 * 1/2012 Lee ........................ H01M 50/30
429/53
(Continued)

FOREIGN PATENT DOCUMENTS

CN      105580193 A    5/2016
CN      108232285 A    6/2018
(Continued)

OTHER PUBLICATIONS

ISR for International Application No. PCT/CN2021/138931 mailed Sep. 14, 2022.
(Continued)

*Primary Examiner* — Matthew T Martin
*Assistant Examiner* — Bartholomew A Hornsby
(74) *Attorney, Agent, or Firm* — East IP P.C.

(57) ABSTRACT

A battery cell, a battery, an electric apparatus, and a manufacturing method and manufacturing device of battery cell are described. The battery cell includes: an electrode assembly; a casing having an accommodating cavity for accommodating the electrode assembly; an exhaust mechanism provided on the casing, the exhaust mechanism including a connecting component and a breathable component, and the breathable component is configured to discharge gas to outside of the casing when gas pressure inside the casing reaches a threshold; and an electrolyte, filled in the casing; where gas permeability A of the breathable component, conductivity S of the electrolyte, and gas containment space
(Continued)

V satisfy 20 mm$^2$*ms/cm*ml<AS/V<165 mm$^2$*ms/cm*ml, and the gas containment space V is a ratio of a remaining value of volume of the accommodating cavity minus volume of the electrolyte and volume of the electrode assembly to capacity of the electrode assembly.

19 Claims, 6 Drawing Sheets

(58) Field of Classification Search
CPC .. H01M 50/35; H01M 50/358; H01M 50/367; H01M 50/394; H01M 50/609
See application file for complete search history.

(56) References Cited

U.S. PATENT DOCUMENTS

| | | | | |
|---|---|---|---|---|
| 2012/0015219 A1* | 1/2012 | Wang | ............... | H01M 50/3425 |
| | | | | 429/53 |
| 2019/0393492 A1* | 12/2019 | David | ............... | H01M 4/5825 |
| 2022/0216566 A1* | 7/2022 | Jackson | ............ | H01M 50/367 |

FOREIGN PATENT DOCUMENTS

| | | |
|---|---|---|
| CN | 209266464 U | 8/2019 |
| CN | 110391367 A | 10/2019 |
| CN | 112216822 A | 1/2021 |
| CN | 112768748 A | 5/2021 |
| CN | 216872160 U | 7/2022 |
| JP | 2005347130 A | 12/2005 |
| KR | 20170112250 A | 10/2017 |
| WO | 2015177617 | 11/2015 |
| WO | 2017073765 A1 | 5/2017 |
| WO | 2021040357 A1 | 3/2021 |

OTHER PUBLICATIONS

Written Opinion for ISR for International Application No. PCT/CN2021/138931 mailed Sep. 14, 2022.
Chinese Notification to Grant cited in counterpart application202180093615.1 dated Jun. 3, 2024.
Chinese Office Action dated Apr. 16, 2024 for Application No. CN 202180093615.1.

* cited by examiner

| | Positive electrode | Negative electrode | S | V | A | Pressure (MPa) | Charge time (min) | Storage days | Energy density increase |
|---|---|---|---|---|---|---|---|---|---|
| Example 1 | 811 | Fast-charging graphite | 8.5 | 0.2 | 0.9 | 0.35 | 12 | 300 | 3% |
| Example 2 | 811 | Fast-charging graphite | 9 | 0.2 | 0.9 | 0.35 | 11 | 250 | 3% |
| Example 3 | 811 | Fast-charging graphite | 10 | 0.2 | 0.9 | 0.35 | 9 | 230 | 3% |
| Example 4 | 811 | Fast-charging graphite | 11 | 0.2 | 0.9 | 0.35 | 8.5 | 80 | 3% |
| Example 5 | 811 | Fast-charging graphite | 10 | 0.1 | 0.9 | 0.35 | 9 | 160 | 5% |
| Example 6 | 811 | Fast-charging graphite | 10 | 0.3 | 0.9 | 0.35 | 9 | 230 | 1% |
| Example 7 | 811 | Fast-charging graphite | 10 | 0.4 | 0.9 | 0.35 | 9 | 280 | 0.30% |
| Example 8 | 811 | Fast-charging graphite | 11 | 0.2 | 0.15 | 0.35 | 8.5 | 60 | 3% |
| Example 9 | 811 | Fast-charging graphite | 11 | 0.2 | 0.45 | 0.35 | 8.5 | 70 | 3% |
| Example 10 | 811 | Fast-charging graphite | 11 | 0.2 | 1.05 | 0.35 | 8.5 | 100 | 3% |
| Example 11 | 811 | Fast-charging graphite | 11 | 0.2 | 1.5 | 0.35 | 8.5 | 150 | 3% |
| Example 12 | LFP | Fast-charging graphite | 10 | 0.2 | 0.9 | 0.35 | 9 | 230 | 3% |
| Example 13 | 811 | Silicon doping 7:3 | 10 | 0.2 | 0.9 | 0.35 | 9 | 230 | 3% |
| Example 14 | 811 | Silicon doping 7:3 | 10 | 0.2 | 0.9 | 0.35 | 9 | 230 | 3% |
| Comparative Example 1 | 811 | Fast-charging graphite | 10 | 0.2 | / | 0.35 | 9 | 65 | 3% |
| Comparative Example 2 | 811 | Fast-charging graphite | 7 | 0.2 | / | 0.35 | 18 | 200 | 3% |
| Comparative Example 3 | 811 | Fast-charging graphite | 10 | 0.7 | / | 0.35 | 9 | 180 | -5% |
| Comparative Example 4 | LFP | Fast-charging graphite | 10 | 0.2 | / | 0.35 | 9 | 65 | 3% |
| Comparative Example 5 | 811 | Silicon doping 7:3 | 10 | 0.2 | / | 0.35 | 9 | 65 | 3% |
| Comparative Example 6 | 811 | Silicon doping 7:3 | 11 | 0.2 | / | 0.35 | 8.5 | 50 | 3% |

FIG. 7

BATTERY CELL, BATTERY, ELECTRIC APPARATUS, AND MANUFACTURING METHOD AND DEVICE OF BATTERY CELL

CROSS REFERENCE TO RELATED APPLICATION

This application is a continuation of International Patent Application No. PCT/CN2021/138931, filed on Dec. 16, 2021, which is incorporated by reference in its entirety.

TECHNICAL FIELD

This application relates to the field of battery technologies and specifically to a battery cell, a battery, an electric apparatus, and a manufacturing method and manufacturing device of battery cell.

BACKGROUND

Batteries are widely used in electronic devices, such as mobile phones, laptops, electric bicycles, electric cars, electric airplanes, electric boats, electric toy cars, electric toy boats, electric toy airplanes, and electric tools.

In the development of battery technologies, in addition to improving the performance of battery cells, how to increase the charging speed of batteries and balance life of batteries is also a problem that needs to be considered and urgently solved.

SUMMARY

Embodiments of this application provide a battery cell, a battery, an electric apparatus, and a manufacturing method and manufacturing device of battery cell, which can improve the charging speed of battery cells while ensuring the service life of battery cells.

According to a first aspect, an embodiment of this application provides a battery cell, including: an electrode assembly; a casing, having an accommodating cavity for accommodating the electrode assembly; an exhaust mechanism disposed on the casing, the exhaust mechanism including a connecting component and a breathable component, where the connecting component is configured to connect the casing, and the breathable component is configured to discharge gas to outside of the casing when gas pressure inside the casing reaches a threshold; and an electrolyte filled in the casing; where specific effective ventilating area A of the breathable component, conductivity S of the electrolyte, and specific gas containment space V satisfy 20 mm$^2$*mS/cm*ml<AS/V<165 mm$^2$*mS/cm*ml, where the specific gas containment space V is a ratio of a remaining value of volume of the accommodating cavity minus volume of the electrolyte and volume of the electrode assembly to capacity of the electrode assembly.

In the above technical solution, the battery cell provided by the embodiments of this application includes a casing, an exhaust mechanism, and an electrolyte. By providing the exhaust mechanism, when the gas pressure inside the casing reaches the threshold, the gas is discharged to the outside of the casing, and the specific effective ventilating area A of the breathable component, the conductivity S of the electrolyte, and the specific gas containment space V are specified to satisfy 20 mm$^2$*mS/cm*ml<AS/V<165 mm$^2$*mS/cm*ml, where the specific gas containment space V is the ratio of the remaining value of the volume of the accommodating cavity minus the volume of the electrolyte and the volume of the electrode assembly to the capacity of the electrode assembly. Compared with existing battery cells, the conductivity of the electrolyte is increased, enabling rapid ion migration and enhancing the overall charging capability of the cell, while balancing the timely discharge of gas generated during the fast charging process through the breathable component of the exhaust mechanism, improving safety performance.

In some embodiments, the specific effective ventilating area A of the breathable component, the conductivity S of the electrolyte, and the specific gas containment space V satisfy: 30 mm$^2$*mS/cm*ml<AS/V<90 mm$^2$*mS/cm*ml.

By making the specific effective ventilating area A of the breathable component, the conductivity S of the electrolyte, and the specific gas containment space V satisfy 30 mm$^2$*mS/cm*ml<AS/V<90 mm$^2$*mS/cm*ml, the relationship among the specific effective ventilating area A of the breathable component, the conductivity S of the electrolyte, and the specific gas containment space V can be further balanced, that is, high charging capability can be ensured while the service life of the battery cell can be extended as much as possible.

In some embodiments, the specific effective ventilating area A of the breathable component is greater than or equal to 0.15 mm$^2$/Ah and less than or equal to 1.5 mm$^2$/Ah.

If the specific effective ventilating area A of the breathable component is too small, such as less than 0.15 mm$^2$/Ah, the ventilating capability of the breathable component may be insufficient, and the gas generated inside the battery cell will not be discharged in time. If the specific effective ventilating area A of the breathable component is too large, such as greater than 1.5 mm$^2$/Ah, the stress on the breathable component increases, making the breathable component susceptible to gas breakthrough and failure, and accelerating the decay of battery cell life. In the battery cell provided by the embodiments of this application, by making the specific effective ventilating area A of the breathable component greater than or equal to 0.15 mm$^2$/Ah and less than or equal to 1.5 mm$^2$/Ah, not only the ventilating capacity of the breathable component can be ensured, but also the risk of breakthrough of the breathable component due to excessive stress can be avoided.

In some embodiments, the specific effective ventilating area A of the breathable component is greater than or equal to 0.45 mm$^2$/Ah and less than or equal to 0.9 mm$^2$/Ah.

With the above configuration, the ventilating area of the breathable component is moderate, better ensuring the ventilating capacity, and reducing the risk of breakthrough due to excessive stress on the breathable component.

In some embodiments, the conductivity S of the electrolyte is greater than or equal to 8.5 mS/cm and less than or equal to 11 mS/cm.

The greater the conductivity S of the electrolyte, such as greater than 11 mS/cm, the greater the ratio of the electrolyte conductivity to the specific gas containment space, reaching the design limit of the battery cell, and ultra-high conductivity may lead to increased side reactions and higher costs. If the conductivity S of the electrolyte is smaller, the ratio of the electrolyte conductivity to the specific gas containment space is smaller, such as less than 8.5 mS/cm, and there is a risk of not being able to achieve high charging capability and high energy density in the battery cell. Therefore, the battery cell provided by the embodiments of this application, with the conductivity S of the electrolyte selected within the above range, can enhance the charging capability of the battery cell and reduce the probability of increased side reactions and higher costs.

In some embodiments, the conductivity S of the electrolyte is greater than or equal to 9 mS/cm and less than or equal to 10 mS/cm.

With the above configuration, high-conductivity fast-charging electrolyte is used to further enhance the charging capability of the battery cell and balances side reactions and costs.

In some embodiments, the specific gas containment space V is greater than or equal to 0.1 ml/Ah and less than or equal to 0.4 ml/Ah.

The smaller the specific gas containment space V, such as less than 0.1 ml/Ah, the greater the ratio of the electrolyte conductivity to the specific gas containment space, reaching the design limit of the battery cell, and ultra-high conductivity may lead to increased side reactions and higher costs. If the specific gas containment space V is larger, such as greater than 0.4 ml/Ah, the ratio of the electrolyte conductivity to the specific gas containment space is smaller, and there is a risk of not being able to achieve high charging capability and high energy density in the battery cell. The battery cell provided by the embodiments of this application, with the specific gas containment space V selected within the above range, can ensure high charging capability and reduce the risk of increased side reactions and higher costs.

In some embodiments, the specific gas containment space V is greater than or equal to 0.2 ml/Ah and less than or equal to 0.35 ml/Ah.

With the above configuration, the risk of increased side reactions and higher costs in the battery cell can be further reduced, while ensuring charging capability.

In some embodiments, the conductivity S of the electrolyte and the specific gas containment space V further satisfy: 20 mS*Ah/(ml*cm)<S/V<110 mS*Ah(ml*cm).

By making the ratio of the conductivity S of the electrolyte and the specific gas containment space V moderate, not only high charging capability can be satisfied, but also the probability of side reactions occurring can be reduced.

In some embodiments, the connecting component is provided with a plurality of first through holes, with a connecting portion being formed between two adjacent first through holes. The breathable component covers the plurality of first through holes, and the connecting portion is configured to attach to the breathable component to limit deformation of the breathable component. The breathable component is configured to discharge gas through the plurality of first through holes to the outside of the casing when the gas pressure inside the battery cell reaches the threshold.

With the above configuration, the connecting component is provided with a plurality of first through holes, and the breathable component covers the plurality of first through holes. When the gas pressure inside the battery cell reaches the threshold, the gas is discharged through the breathable component and the plurality of first through holes to the outside of the battery cell to achieve the purpose of discharging the gas inside the battery cell. Since the connecting component includes a connecting portion formed between adjacent first through holes, the connecting portion can be attached to the breathable component. When the gas inside the battery cell acts on the breathable component during the process of discharging through the breathable component to the outside of the battery cell, the connecting portion can provide the breathable component with a counteracting force against the internal pressure of the battery cell, reducing the deformation of the breathable component, improving the overall pressure resistance of the exhaust mechanism 24, and thereby enhancing the safety of the battery cell.

In some embodiments, the breathable component is disposed on a side of the connecting component facing the electrode assembly, and the connecting portion is configured to provide support force to the breathable component when the breathable component deforms towards the outside of the battery cell.

The breathable component is disposed on the side of the connecting component facing the inside of the battery cell. During an exhaust process, the connecting component can provide support force to the breathable component, ensuring sufficient exhaust area while avoiding excessive internal pressure in the battery cell leading to deformation or displacement of the breathable component, ensuring the integrity of the breathable component, and improving safety. Additionally, having the breathable component disposed on the side of the connecting component facing the inside of the battery cell can increase the utilization of external space of the end cover, facilitating inkjet printing or implementing more functions.

In some embodiments, the casing and the exhaust mechanism are provided separately, and the exhaust mechanism is connected to the casing through the connecting component.

Providing the casing and the exhaust mechanism separately allows for them to be two independent components before assembly, produced separately. When assembled together, the exhaust mechanism is connected to the casing through the connecting component.

In some embodiments, the casing is provided with a first recess, the first recess being configured to accommodate at least part of the exhaust mechanism.

By providing a first recess in the casing and accommodating at least part of the exhaust mechanism within the first recess, the overall occupied space of the exhaust mechanism can be reduced. Moreover, the provision of the first recess can help position the installation of the exhaust mechanism, reducing the assembly difficulty between the exhaust mechanism and the casing.

In some embodiments, the connecting component includes a main body region and an exhaust region. The main body region is configured to connect the casing, and the exhaust region includes the connecting portion and the plurality of first through holes. One part of the breathable component is attached to the main body region, and another part thereof is attached to the connecting portion of the exhaust region. The casing is provided with a shielding portion and a second through hole at the bottom of the first recess. The shielding portion is configured to shield at least part of the exhaust region, and the second through hole is configured to communicate with a space defined by the first recess.

By defining the connecting component to include a main body region and an exhaust region, the main body region can be connected to the casing, ensuring the connection strength between the connecting component and the casing. The exhaust region can discharge gas inside the battery cell, ensuring the safety performance of the battery cell. Since one part of the breathable component is attached to the main body region and another part thereof is attached to the exhaust region, the breathable component is not only attached to the connecting portion but also to the main body region, ensuring the attachment strength between the breathable component and the connecting component, reducing the risk of separation between them. The shielding portion is configured to shield at least part of the exhaust region, preventing at least some foreign matter from entering multiple first through holes, thus avoiding any impact on the breathable component and ensuring its performance. The second through hole is configured to communicate with the space defined by the first recess, allowing the gas inside the battery cell to be discharged, ensuring the safety of the battery cell.

In some embodiments, the shielding portion is provided with a second recess, which recedes from the bottom surface of the first recess in a direction leaving the breathable component. A clearance space is formed between the bottom surface of the second recess and the exhaust mechanism to allow clearance for the exhaust region.

By providing the second recess in the shielding portion and forming a clearance space between the bottom surface of the second recess and the exhaust mechanism, when the orthographic projection of at least part of the first through holes in the axial direction is covered by the shielding portion, contact between the shielding portion and the exhaust region of the connecting component can be avoided, preventing the shielding portion from sealing the covered first through holes and ensuring the exhaust needs of the battery cell inside, improving the safety performance of the battery cell.

In some embodiments, the first recess recedes from the inner surface of the casing in a direction leaving the electrode assembly, the shielding portion is located on a side of the exhaust mechanism facing away from the electrode assembly, and the second through hole is configured to communicate the external space of the battery cell with the first recess.

In the above technical solution, the first recess recedes from the inner surface of the casing in the direction leaving the inside of the battery cell, the shielding portion is located on the side of the exhaust mechanism facing away from the inside of the battery cell, and the second through hole is configured to communicate the external space of the battery cell with the first recess, allowing the gas inside the battery cell to pass through the breathable mechanism and successively pass through the second through hole and the first through hole and be discharged. The position of the shielding portion can effectively block external foreign matter from entering the first through hole, reducing the risk of damage to the breathable component.

In some embodiments, the casing includes a housing and a cover assembly. The housing has an opening, the cover assembly closes the opening, and one of the housing and the cover assembly is provided with the exhaust mechanism.

According to a second aspect, embodiments of this application provide a battery, the battery including the aforementioned battery cell.

According to a third aspect, embodiments of this application provide an electric apparatus, the electric apparatus including the aforementioned battery for providing electrical energy.

According to a fourth aspect, embodiments of this application provide a manufacturing method of battery cell, including:
  providing a housing, the housing having an accommodating cavity and an opening communicating with the accommodating cavity;
  providing an electrode assembly and loading the electrode assembly into the accommodating cavity of the housing;
  providing a cover assembly and sealing the opening with the cover assembly, where the cover assembly and the housing together form a casing, the casing is provided with an exhaust mechanism, the exhaust mechanism includes a connecting component and a breathable component, the connecting component is configured to connect the casing, and the breathable component is configured to discharge gas to outside of the casing when gas pressure inside the casing reaches a threshold; and
  injecting electrolyte into the accommodating cavity so that specific effective ventilating area A of the breathable component, conductivity S of the electrolyte, and specific gas containment space V satisfy 20 mm$^2$*mS/cm*ml<AS/V<165 mm$^2$*mS/cm*ml, where the specific gas containment space V is equal to a ratio of a remaining value of volume of the accommodating cavity minus volume of the electrolyte and volume of the electrode assembly to capacity of the electrode assembly.

According to a fifth aspect, embodiments of this application provide a manufacturing device of battery cell, including:
  a first assembly apparatus, configured to provide a housing, the housing having an accommodating cavity and an opening communicating with the accommodating cavity;
  a second assembly apparatus, configured to provide an electrode assembly and load the electrode assembly into the accommodating cavity of the housing;
  a third assembly apparatus, configured to provide a cover assembly and sealing the opening with the cover assembly, where the cover assembly and the housing together form a casing, the casing is provided with an exhaust mechanism, the exhaust mechanism includes a connecting component and a breathable component, the connecting component is configured to connect the casing, and the breathable component is configured to discharge gas to outside of the casing when gas pressure inside the casing reaches a threshold; and
  an injection apparatus, configured to inject electrolyte into the casing so that specific effective ventilating area A of the breathable component, conductivity S of the electrolyte, and specific gas containment space V satisfy 20 mm$^2$*mS/cm*ml<AS/V<165 mm$^2$*mS/cm*ml, where the specific gas containment space V is equal to a ratio of a remaining value of volume of the accommodating cavity minus volume of the electrolyte and volume of the electrode assembly to capacity of the electrode assembly.

The above description is only an overview of the technical solutions of this application. For better understanding of the technical means of this application so that it can be implemented according to the contents of the specification, and to make the above and other objects, features, and advantages of this application more apparent and easy to understand, the following specific embodiments of this application are provided.

BRIEF DESCRIPTION OF DRAWINGS

In order to more clearly illustrate the technical solutions of the embodiments of this application, the drawings needed for the embodiments of this application will be briefly introduced below. It is obvious that the drawings described below are only some embodiments of this application, and for those skilled in the art, other drawings can also be obtained based on the drawings without creative effort.

FIG. 7 is a schematic diagram illustrating matching between an exhaust mechanism and a casing;

Figure 1:
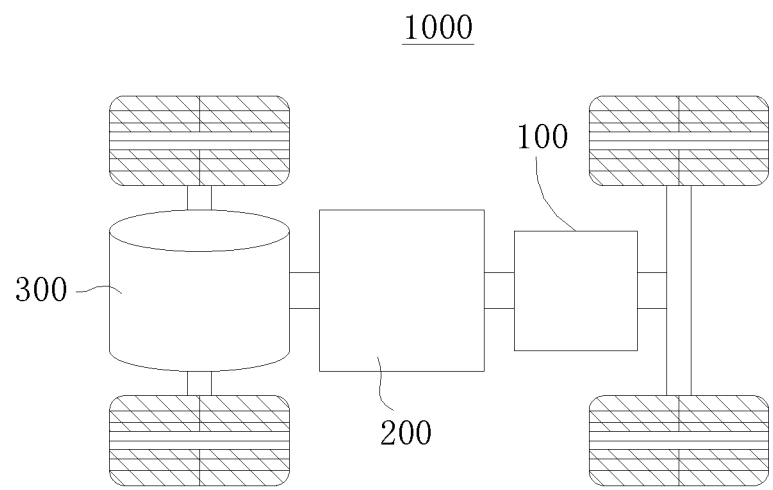
FIG. 1 is a schematic structural diagram of a vehicle according to some embodiments of this application.

Reference signs in the specific embodiments are as follows:

1000—vehicle;
100—battery; 200 —; 300—motor;
10—box; 11—first portion; 12—second portion; 13—accommodating space;
20—battery cell;
21—cover assembly; 21a—electrode terminal; 21b—cover plate; 211—first recess; 212—shielding portion; 213—second through hole; 214—second recess;
22—housing;
23—electrode assembly;
24—exhaust mechanism; 241—connecting component; 2411—first through hole; 2412—connecting portion; 241a—main body region; 241b—exhaust region; 242—breathable component;
25—electrolyte;
26—insulating plate;
2000—device; 2100—first assembly apparatus; 2200—second assembly apparatus; 2300—third assembly apparatus; 2400—injection apparatus;
X—axial direction.

In the drawings, the same components are marked with the same reference signs. The drawings are not drawn to actual scale.

DETAILED DESCRIPTION

To make the objectives, technical solutions, and advantages of the embodiments of this application clearer, the following clearly describes the technical solutions in the embodiments of this application with reference to the accompanying drawings in the embodiments of this application. Apparently, the embodiments described are some rather than all embodiments of this application. All other embodiments obtained by persons of ordinary skill in the art based on the embodiments of this application without creative efforts shall fall within the protection scope of this application.

Unless otherwise defined, all technical and scientific terms used in this application shall have the same meanings as commonly understood by those skilled in the art to which this application relates. The terms used in the specification of this application are intended to merely describe the specific embodiments rather than to limit this application. The terms "include", "comprise", and any variations thereof in the specification and claims of this application as well as the foregoing description of drawings are intended to cover non-exclusive inclusions. In the specification, claims, or accompanying drawings of this application, the terms "first", "second", and the like are intended to distinguish between different objects rather than to indicate a particular order or relative importance.

Reference to "embodiment" in this application means that specific features, structures, or characteristics described with reference to the embodiment may be included in at least one embodiment of this application. The word "embodiment" appearing in various places in the specification does not necessarily refer to the same embodiment or an independent or alternative embodiment that is exclusive of other embodiments.

In the description of this application, it should be noted that unless otherwise specified and defined explicitly, the terms "mount", "connect", "join", and "attach" should be understood in their general senses. For example, they may refer to a fixed connection, a detachable connection, or an integral connection, and may refer to a direct connection, an indirect connection via an intermediate medium, or an internal communication between two elements. A person of ordinary skills in the art can understand specific meanings of these terms in this application as appropriate to specific situations.

The term "and/or" in this application is only an associative relationship for describing associated objects, indicating that three relationships may be present. For example, A and/or B may indicate three cases: presence of only A; presence of both A and B; and presence of only B. In addition, the character "/" in this application generally indicates an "or" relationship between contextually associated objects.

In the embodiments of this application, like reference signs denote like components, and for brevity, in different embodiments, detailed descriptions of like components are not repeated. It should be understood that, as shown in the accompanying drawings, sizes such as thickness, length, and width of various components and sizes such as thickness, length, and width of integrated devices in the embodiments of this application are merely for illustrative purposes and should not constitute any limitations on this application.

In this application, "a plurality of" means more than two (inclusive).

In this application, the battery cell may include a lithium-ion secondary battery, a lithium-ion primary battery, a lithium-sulfur battery, a sodium-lithium-ion battery, a sodium-ion battery, a magnesium-ion battery, or the like. This is not limited in the embodiments of this application. The battery cell may be cylindrical, flat, cuboid, or of other shapes, which is not limited in the embodiments of this application either. Battery cells are typically divided into three types by packaging method: cylindrical cell, prismatic cell, and pouch cell. The type of battery is not limited in the embodiments of this application either.

The battery mentioned in the embodiments of this application is a single physical module that includes one or more battery cells for providing a higher voltage and capacity. For example, the battery mentioned in this application may include a battery module, a battery pack, or the like. A battery typically includes a box configured to enclose one or more battery cells. The box can prevent liquids or other foreign matter from affecting charging or discharging of the battery cell.

The battery cell includes an electrode assembly and an electrolyte. The electrode assembly includes a positive electrode plate, a negative electrode plate, and a separator. Working of the battery cell mainly relies on migration of metal ions between the positive electrode plate and the negative electrode plate. The positive electrode plate includes a positive electrode current collector and a positive electrode active substance layer. The positive electrode active substance layer is applied on a surface of the positive electrode current collector. The part of positive electrode current collector uncoated with the positive electrode active substance layer protrudes out of the part of positive electrode current collector coated with the positive electrode active substance layer and serves as a positive tab. A lithium-ion battery is used as an example, for which, the positive electrode current collector may be made of aluminum and the positive electrode active substance may be lithium cobaltate, lithium iron phosphate, ternary lithium, lithium manganate, or the like. The negative electrode plate includes a negative electrode current collector and a negative electrode active substance layer. The negative electrode active substance layer is applied on a surface of the negative electrode current collector. The part of negative electrode current collector uncoated with the negative electrode active substance layer protrudes out of the part of negative electrode current collector coated with the negative electrode active substance layer and serves as a negative tab. The negative electrode current collector may be made of copper, and the negative electrode active substance may be carbon, silicon, or the like. To allow a large current to pass through without any fusing, multiple positive tabs are provided and stacked together, and multiple negative tabs are provided and stacked together. The separator may be made of PP (polypropylene, polypropylene), PE (polyethylene, polyethylene), or the like. In addition, the electrode assembly may be a wound structure or a stacked structure, but the embodiments of this application are not limited thereto.

The development of battery technology requires consideration of various design factors, such as energy density, cycle life, discharge capacity, charge and discharge rates, and other performance parameters. Additionally, the safety of the battery must also be considered.

After a battery cell experiences a number of charge and discharge cycles, side reactions may occur, continuously generating gas, causing internal pressure within the battery cell. As the pressure increases, the gas between the electrode plates cannot be discharged in a timely manner, which affects the intercalation and deintercalation of lithium ions and may lead to the risk of lithium precipitation. To ensure the safety of the battery cell, an exhaust mechanism is generally set up within the battery cell to discharge the generated gas, thereby ensuring safety of the battery cell.

The inventors have found that current approaches to improving the fast-charging capability and gas generation life of battery cells mainly focus on the electrolyte. High-ion fast-charging electrolytes can significantly enhance fast-charging capabilities, but the resulting high gas generation has always been a difficult problem to solve.

During the battery charging process, ions (such as lithium ions and sodium ions) are released from the positive electrode active material and enter the electrolyte. They then enter the pores of a porous negative electrode with the electrolyte, where liquid phase ionic conduction occurs within the pores. In this process, the magnitude of the ionic conductivity is crucial. High ionic conductivity enables rapid ion migration, enhancing the overall charging capability of the battery cell. However, high lithium-ion conductivity implies the use of low-viscosity solvents, which have low oxidation potentials and are easily oxidized, generating a large amount of gas and posing safety issues. At the same time, high gas-generating electrolytes often require a larger specific gas containment space to reduce safety hazards and a breathable top cover to discharge the gas inside the housing.

Through extensive research, the inventors have further discovered that the charging capability and life of a battery are closely related to the ratio of the specific effective ventilating area of the breathable component provided on the casing, the conductivity of the electrolyte, and the specific gas containment space. Greater specific effective ventilating area and larger effective ventilating area of the breathable component are more conducive to the discharge of gas inside the battery cell. However, the breathable component will be subjected to greater force and is more prone to deformation. Moreover, greater conductivity of the electrolyte and smaller specific gas containment space lead to better charging capability of the battery and higher energy density, but also greater gas production. Therefore, it is necessary to properly adjust the proportional relationship of the specific effective ventilating area of the breathable component, the conductivity of the electrolyte, and the specific gas containment space to ensure that the battery cell has both a long gas generation life and fast-charging capability.

In view of this, embodiments of this application provide a battery cell, which includes an electrode assembly, a casing, an exhaust mechanism, and an electrolyte. The casing has an accommodating cavity for accommodating the electrode assembly. The exhaust mechanism is disposed on the casing and includes a connecting component and a breathable component. The connecting component is configured to connect the casing, and the breathable component is configured to discharge gas to outside of the casing when gas pressure inside the casing reaches a threshold. The electrolyte is filled in the casing. specific effective ventilating area A of the breathable component, conductivity S of the electrolyte, and specific gas containment space V satisfy 20 mm$^2$*mS/cm*ml<AS/V<165 mm$^2$*mS/cm*ml. The specific gas containment space V is equal to a ratio of a remaining value of volume of the accommodating cavity minus volume of the electrolyte and volume of the electrode assembly to capacity of the electrode assembly.

Compared to existing battery cells, the conductivity of the electrolyte is improved, enabling rapid ion migration and enhancing the overall charging capability of the battery cell. Moreover, this can balance the timely discharge of the gas generated during the fast-charging process from the breathable component of the exhaust mechanism, improving safety performance. As a result, the battery cell as a whole possesses both a long gas generation life and fast-charging capability.

The battery cell described in this embodiment is applicable to batteries and electric apparatuses and devices that use batteries.

The electric apparatuses and devices can be vehicles, mobile phones, portable devices, laptops, ships, spacecraft, electric toys, electric tools, and the like. Vehicles can be fueled by gasoline, natural gas, or new energy vehicles. New energy vehicles can be battery electric vehicles, hybrid vehicles, extended-range electric vehicles, or the like. Spacecraft includes airplanes, rockets, space shuttles, spaceships, and the like. Electric toys include fixed or mobile electric toys, such as game consoles, electric toy cars, electric toy boats, electric toy airplanes, and the like. Electric tools include electric metal cutting tools, electric grinding tools, electric assembling tools, and railway-specific electric tools, such as electric drills, electric grinders, electric wrenches, electric screwdrivers, electric hammers, electric impact drills, concrete vibrators, and electric planers. This application does not make any special limitations on the above-mentioned electric device.

For the purpose of description, the following embodiments use a vehicle as an example of the electric device to illustrate the application.

Refer to FIG. 1. FIG. 1 shows a schematic diagram of the structure of a vehicle 1000 provided in some embodiments of this application. The vehicle 1000 may be a fossil fuel vehicle, a natural-gas vehicle, or a new energy vehicle, where the new energy vehicle may be a battery electric vehicle, a hybrid electric vehicle, a range-extended vehicle, or the like. The vehicle 1000 is equipped with a battery 100 inside. The battery 100 can be located at the bottom, top, or rear of the vehicle 1000. The battery 100 can be used to power the vehicle 1000, for example, the battery 100 can serve as an operating power source for the vehicle 1000. The vehicle 1000 can also include a controller 200 and a motor 300. The controller 200 is configured to control the battery 100 to supply power to the motor 300, for example, to meet the electrical power requirements for starting, navigating, and driving of the vehicle 1000.

In some embodiments of this application, the battery 100 can not only serve as the operating power source of the vehicle 1000, but also as a driving power source of the vehicle 1000, replacing or partially replacing fuel or natural gas to provide driving power for the vehicle 1000.

Figure 2:
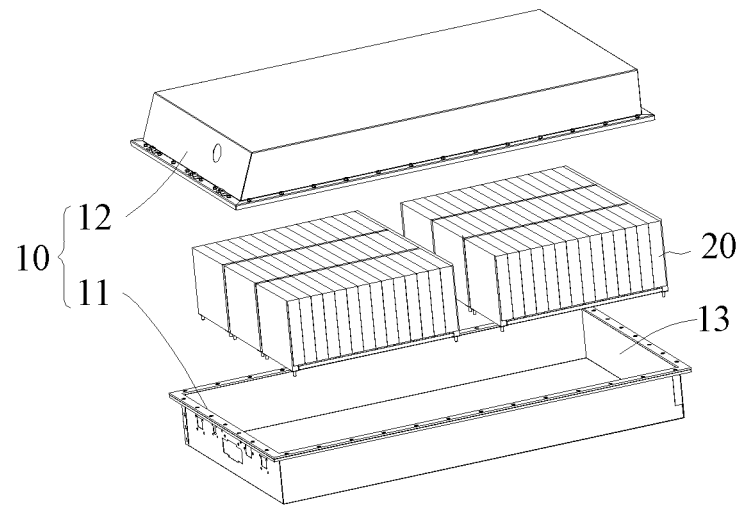
FIG. 2 is an exploded view of a battery according to some embodiments of this application.
Figure 3:
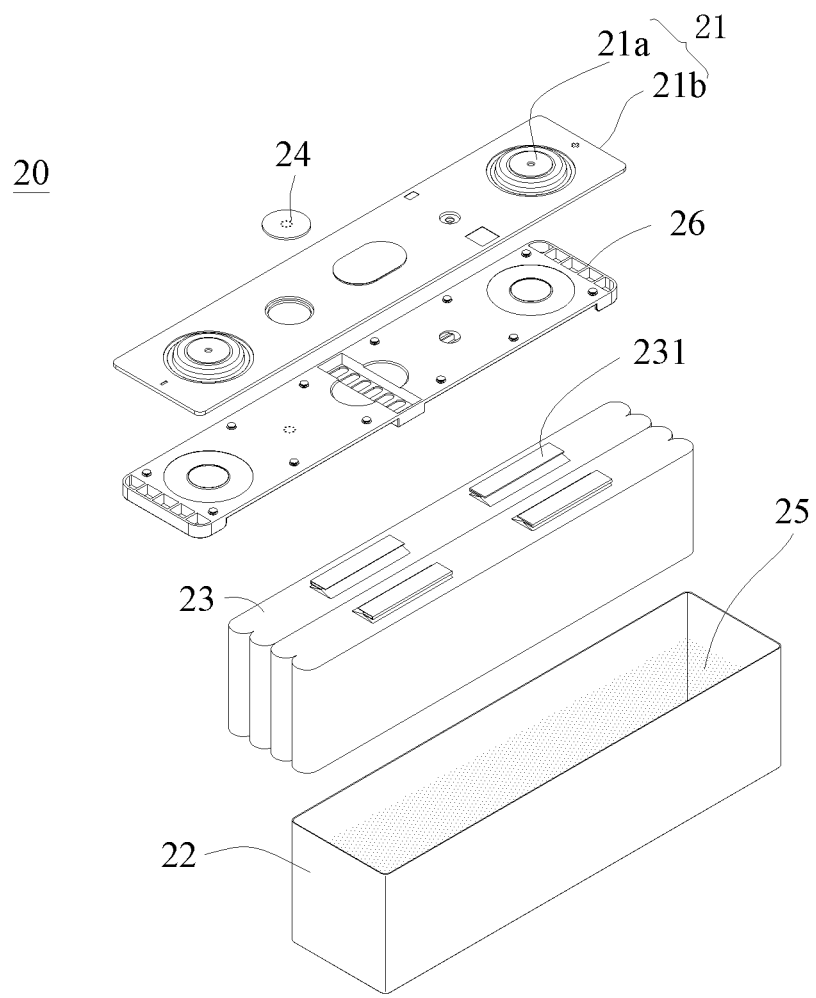
FIG. 3 is a schematic diagram of a disassembled structure of a battery cell according to some embodiments of this application.
Figure 4:
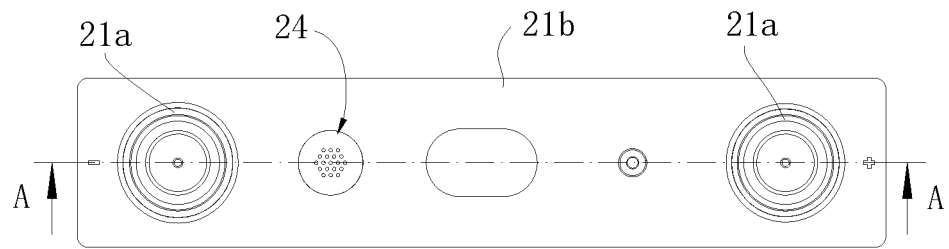
FIG. 4 is a top view of a battery cell in some embodiments of this application.
Figure 5:
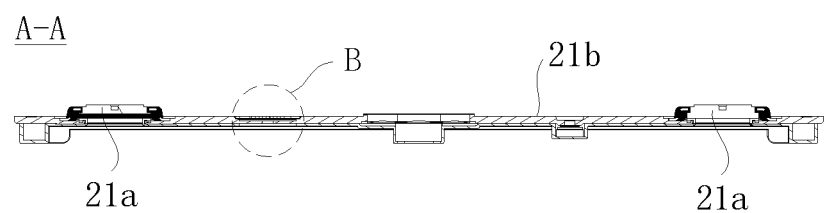
FIG. 5 is a partial cross-sectional view taken along direction A-A in FIG. 4.
Figure 6:
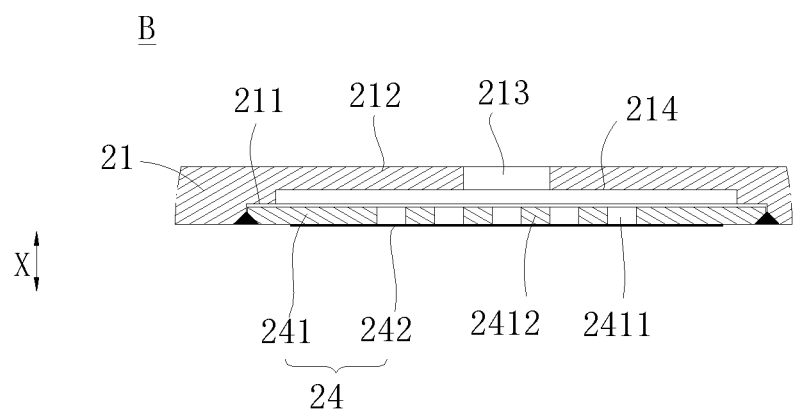
FIG. 6 is an enlarged view of position B in FIG. 5.

Refer to FIG. 2. FIG. 2 is an exploded view of the battery 100 provided in some embodiments of this application. The battery 100 includes a box 10 and a battery cell 20, where the battery cell 20 is accommodated in the box 10. Among them, the box 10 is configured to provide an accommodating space for the battery cell 20. The box 10 can have various structures. In some embodiments, the box 10 can include a first portion 11 and a second portion 12. The first portion 11 and the second portion 12 are mutually overlapped to define an accommodating space for accommodating the battery cell 20. The second portion 12 can be a hollow structure with one side open, and the first portion 11 can be a plate structure, with the first portion 11 covering the open side of the second portion 12, so that the first portion 11 and the second portion 12 together define the accommodating space 13. Alternatively, the first portion 11 and the second portion 12 can both be hollow structures with one side open, the opening side of the first portion 11 overlapping with the opening side of the second portion 12. The first portion 11 and the second portion 12 can have various shapes though, such as rectangular or cylindrical.

In the battery 100, there may be one or more battery cells 20. If multiple battery cells 20 are used, they can be connected in series, parallel or series-parallel. "Series-parallel" refers to multiple battery cells 20 in which some are connected in series and some are connected in parallel. Multiple battery cells 20 can be first connected in series, parallel, or series-parallel to form a battery module, and multiple battery modules can then be connected in series, parallel, or series-parallel to form a whole and be accommodated in the box 10. Alternatively, the battery 100 can be one with all the battery cells 20 directly connected in series, parallel, or series-parallel, and the whole composed of all the battery cells 20 accommodated in the box 10. The battery 100 may also include other components, for example the battery 100 also includes a busbar component, which allows for electrical connections between multiple battery cells 20.

Each battery cell 20 can be a secondary battery or a primary battery, and it can be a lithium-sulfur battery, a sodium-ion battery, or a magnesium-ion battery, without being limited to these. The battery cell 20 can be cylindrical, flat, rectangular, or other shapes.

Refer to FIGS. 3 to 6. A battery cell is the smallest unit that constitutes a battery. The battery cell 20 includes a casing, an electrode assembly 23, an exhaust mechanism 24, an electrolyte 25, and other functional components. The casing has an accommodating cavity for accommodating the electrode assembly 23. Tab 231 is disposed on the electrode assembly 23. The exhaust mechanism 24 is disposed on the casing and includes a connecting component 241 and a breathable component 242. The connecting component 241 is configured to connect the casing, and the breathable component 242 is configured to discharge gas to outside of the casing when gas pressure inside the casing reaches a threshold. The electrolyte 25 is filled in the casing. Specific effective ventilating area A of the breathable component 242, conductivity S of the electrolyte 25, and specific gas containment space V satisfy $mm^2*mS/cm*ml < AS/V < 165\ mm^2*mS/cm*ml$. The specific gas containment space V is equal to a ratio of a remaining value of volume of the accommodating cavity minus volume of the electrolyte 25 and volume of the electrode assembly 23 to capacity of the electrode assembly 23.

The casing may include a cover assembly 21 and a housing 22. The cover assembly 21 is a component that seals the opening of the housing 22 to isolate the internal environment of the battery cell 20 from the external environment. Without limitation, the shape of the cover assembly 21 can be adapted to the shape of the housing 22 to fit the housing 22. Optionally, the cover assembly 21 can be made of a material with sufficient hardness and strength (such as aluminum alloy), so that the cover assembly 21 is not easily deformed when subjected to compression and collision, making the battery cell 20 have higher structural strength and improved safety performance. Functional components such as electrode terminals 21a and a cover plate 21b can be included on the cover assembly 21. The electrode terminal 21a can be used for electrical connection with the electrode assembly 23 for outputting or inputting electrical energy of the battery cell 20. The material of the cover assembly 21 can also be various, such as copper, iron, aluminum, stainless steel, aluminum alloy, and plastic, and the embodiments of this application do not impose special limitations. In some embodiments, an insulating component 26 can be provided on the inner side of the cover assembly 21, which can be used to isolate the electrode assembly 23 inside the housing 22 from the cover assembly 21 to reduce the risk of short circuit. For example, the insulating component can be plastic or rubber.

The housing 22 is a component used to cooperate with the cover assembly 21 to form the internal environment of the battery cell 20, where the formed internal environment can be used to accommodate the electrode assembly 23, the electrolyte 25, and other components. The housing 22 and the cover assembly 21 can be independent components, and an opening can be provided on the housing 22. The internal environment of the battery cell 20 can be formed by sealing the opening with the cover assembly 21 at the opening. Without limitation, the cover assembly 21 and the housing 22 can instead be integrated. Specifically, the cover assembly 21 and the housing 22 can form a common connection surface before other components enter the casing, and when it is necessary to package the inside of the housing 22, the cover assembly 21 can then cover the housing 22. The housing 22 can have various shapes and sizes, such as rectangular, cylindrical, and hexagonal prism. Specifically, the shape of the shell 22 can be determined according to the specific shape and size of the electrode assembly 23. The material of the housing 22 can be various, such as copper, iron, aluminum, stainless steel, aluminum alloy, and plastic, and embodiments of this application do not impose special limitations on this.

The electrode assembly 23 is a component in the battery cell 20 where the electrochemical reaction occurs. The housing 22 can contain one or more electrode assemblies 23. The electrode assembly 23 is mainly formed by winding or stacking positive and negative electrode plates, and a separator is usually placed between the positive and negative electrode plates. The portions of the positive and negative electrode plates containing active materials constitute the main body of the electrode assembly 23, while the portions without active materials form respective electrode tabs. The positive and negative electrode tabs can be located together at one end of the main body or separately at two ends. During the charging and discharging process of the battery, the positive and negative active materials react with the electrolyte 25, and the electrode tabs are connected to the electrode terminals 21a to form a current loop.

The exhaust mechanism 24 is disposed on the casing and is configured to discharge gas to the outside of the casing when the gas pressure inside the casing reaches the threshold. The exhaust mechanism 24 can be arranged on the cover assembly 21 or the housing 22.

The connecting component 241 and the casing can adopt an integrated structure, or they can adopt separate structures. When separate structures are used, they can be fixedly connected by welding or other methods. The connecting component 241 can connect the breathable component 242 to the casing and ensure sealing of the battery cell 20.

The breathable component 242 has a ventilating function and is configured to discharge gas to the outside of the battery cell 20 when the gas pressure inside the battery cell 20 reaches a first threshold. Its material can be PP (polypropylene, polypropylene), PE (polyethylene, polyethylene), PU (polyurethane, polyurethane), or the like. The gas inside the battery cell 20 needs to pass through the breathable component 242 when being discharged. The breathable component 242 allows the gas inside the battery cell 20 to flow to the outside while preventing water vapor and other substances from entering the battery cell 20 from the outside.

The electrolyte 25 is filled inside the casing and contacts the electrode assembly 23, allowing ions (such as lithium ions and sodium ions) released from the active material of the positive electrode plate during the charging process of the electrode assembly 23 to enter the electrolyte 25 and, along with the electrolyte 25, enter the pores of the porous negative electrode to perform ion conduction in the liquid phase within the pores, thus achieving charging and discharging.

The specific effective ventilating area A of the breathable component 242 can be understood as the ratio of the effective ventilating area of the breathable component 242 to the capacity of the electrode assembly 23.

The conductivity S of the electrolyte 25 refers to the ion migration in the electrolyte 25. During the battery charging process, ions (such as lithium ions and sodium ions) released from the positive active material enter the electrolyte 25 and, along with the electrolyte 25, enter the pores of the porous negative electrode to perform ion conduction in the liquid phase within the pores.

The volume of the accommodating cavity of the casing is V1, the volume of the electrolyte 25 filled inside the battery cell 20 as a finished product is V2, and the volume of the electrode assembly 23 is V3. Thus, the specific gas containment space V satisfies V=(V1−V2−V3)/capacity of the electrode assembly.

The specific gas containment space V can also be understood as the ratio of the volume of the electrolyte 25 injected into the casing until it fills the entire accommodating cavity to the capacity of the electrode assembly 23 after the battery cell 20 is finished.

The product of the specific effective ventilating area A of the breathable component 242 and the conductivity S of the electrolyte 25 should be greater than 20 $mm^2*mS/cm*ml$ and less than 165 $mm^2*mS/cm*ml$ when compared to the specific gas containment space V.

As previously analyzed, the conductivity of the electrolyte 25 during the battery charging process is crucial. High conductivity allows for rapid ion migration, improving the charging capability of the entire battery cell 20. However, high conductivity implies the use of low-viscosity solvents with low oxidation potentials, which are easily oxidized, generating a large amount of gas and leading to safety issues. At the same time, electrolytes 25 that produce a high amount of gas often require more specific gas containment space to reduce safety hazards.

The breathable component 242 on the casing can discharge gas inside the housing 22. Greater specific effective ventilating area and larger effective ventilating area of the breathable component 242 are more favorable for discharging gas from the casing, but the casing bears greater force and is more prone to deformation. Greater conductivity of the electrolyte 25 and smaller specific gas containment space lead to better charging capability and higher energy density of the battery cell 20, but also greater gas production. The battery cell 20 provided in this application embodiment is equipped with an exhaust mechanism 24 to discharge gas to the outside of the casing when the gas pressure inside the casing reaches a threshold value. Additionally, the specific effective ventilating area A of the breathable component 242, the conductivity S of the electrolyte 25, and the specific gas containment space V are specified to satisfy 20 $mm^2*mS/cm*ml$<AS/V<165 $mm^2*mS/cm*ml$, where the specific gas containment space V is a ratio of a remaining value of volume of the accommodating cavity minus volume of the electrolyte 25 and volume of the electrode assembly 23 to capacity of the electrode assembly 23. By reasonably adjusting the proportional relationship of the specific effective ventilating area A of the breathable component 242, the conductivity S of the electrolyte 25, and the specific gas containment space V, the conductivity of the electrolyte 25 is improved, allowing for rapid ion migration and enhancing the charging capability of the entire battery core. Moreover, this can balance the timely discharge of gas generated during the fast charging process through the breathable component 242 of the exhaust mechanism 24, improving safety performance and providing the battery cell 20 with both super-fast charging and a long service life advantage.

Specifically, by ensuring that the proportional relationship of the specific effective ventilating area A of the breathable component 242, the conductivity S of the electrolyte 25, and the specific gas containment space V is greater than 20 $mm^2*mS/cm*ml$, the pressure difference between inside and outside the breathable component 242 can discharge gas from the housing 22, allowing for fast charging and ensuring energy density. If the proportional relationship of the specific effective ventilating area A of the breathable component 242, the conductivity S of the electrolyte 25, and the specific gas containment space V is less than 20 $mm^2*mS/cm*ml$, it indicates that the specific effective ventilating area A of the breathable component 242 is relatively small or the ratio of the conductivity S of the electrolyte 25 to the specific gas containment space V is relatively small. When A is relatively small, the ventilating capacity of the breathable component 242 is insufficient, and gas cannot be discharged in time, leading to a reduced service life. If the ratio of the conductivity S of the electrolyte 25 to the specific gas containment space V is relatively small, it cannot meet the requirements for high charging capability and high energy density.

At the same time, by ensuring that the proportional relationship of the specific effective ventilating area A of the breathable component 242, the conductivity S of the electrolyte 25, and the specific gas containment space V is less than 165 mm²*mS/cm*ml, the conductivity S of the electrolyte 25 and the specific gas containment space V have already approached extreme values, and the pressure on the breathable component 242 is within the material characteristic range. If the proportional relationship of the specific effective ventilating area A of the breathable component 242, the conductivity S of the electrolyte 25, and the specific gas containment space V is greater than 165 mm²*mS/cm*ml, it indicates that the specific effective ventilating area A of the breathable component 242 is exceptionally large or the ratio of the conductivity S of the electrolyte 25 to the specific gas containment space V is exceptionally large. If the specific effective ventilating area A of the breathable component 242 is exceptionally large, the stress on the breathable component 242 increases, and the ventilating membrane is prone to failure due to gas breakthrough, leading to accelerated cell life decay. If the ratio of the conductivity S of the electrolyte 25 to the gas containment space V is exceptionally large, reaching the design limit of the battery cell 20, the excessively high conductivity may lead to an increase in side reactions and costs. Additionally, a too-small specific gas containment space V poses safety risks.

In some optional embodiments, the proportional relationship of the specific effective ventilating area A of the breathable component 242, the conductivity S of the electrolyte 25, and the specific gas containment space V, that is, AS/V, can take a value selected from any of the values 20 mm²*mS/cm*ml, 40 mm²*mS/cm*ml, 60 mm²*mS/cm*ml, 70 mm²*mS/cm*ml, 80 mm²*mS/cm*ml, 100 mm²*mS/cm*ml, 120 mm²*mS/cm*ml, or 140 mm²*mS/cm*ml to improve the charging speed of the battery cell 20 while ensuring its service life.

In some embodiments, the specific effective ventilating area A of the breathable component 242, the conductivity S of the electrolyte 25, and the specific gas containment space V satisfy: 30 mm²*mS/cm*ml<AS/V<90 mm²*mS/cm*ml.

In other words, the ratio of the product of the specific effective ventilating area A of the breathable component 242 and the conductivity S of the electrolyte 25 to the specific gas containment space V should be greater than 30 mm²*mS/cm*ml $_{and}$ 90 mm²*mS/cm*ml.

By ensuring that the specific effective ventilating area A of the breathable component 242, the conductivity S of the electrolyte 25, and the specific gas containment space V satisfy 30 mm²*mS/cm*ml<AS/V<90 mm²*mS/cm*ml, a further balance can be achieved among the specific effective ventilating area A of the breathable component 242, the conductivity S of the electrolyte 25, and the specific gas containment space V, ensuring high charging capability while maximizing the service life of the battery cell 20.

In some embodiments, the specific effective ventilating area A of the breathable component 242 is greater than or equal to 0.15 mm²/Ah and less than or equal to 1.5 mm²/Ah.

In other words, the specific effective ventilating area A of the breathable component 242 can be any value between 0.15 mm²/Ah and 1.5 mm²/Ah.

If the specific effective ventilating area A of the breathable component 242 is too small, such as less than 0.15 mm²/Ah, the ventilating capacity of the breathable component 242 may be insufficient, and the gas generated inside the battery cell 20 may not be discharged in time. If the specific effective ventilating area A of the breathable component 242 is too large, such as greater than 1.5 mm²/Ah, the stress on the breathable component 242 increases, and the breathable component 242 is prone to failure due to gas breakthrough, causing the battery cell 20 life to decay faster. The battery cell 20 provided in the embodiments of this application ensures that the specific effective ventilating area A of the breathable component 242 is greater than or equal to 0.15 mm²/Ah and less than or equal to 1.5 mm²/Ah, which can guarantee the ventilating capacity of the breathable component 242 while avoiding risks such as breakthrough due to excessive stress on the breathable component 242.

In some embodiments, the specific effective ventilating area A of the breathable component 242 is greater than or equal to 0.45 mm²/Ah and less than or equal to 0.9 mm²/Ah. In other words, the specific effective ventilating area A of the breathable component 242 can be any value between 0.45 mm²/Ah and 0.9 mm²/Ah.

The above settings enable the breathable component 242 to have a moderate ventilating area, better ensuring the ventilating capacity and reducing the risk of breakthrough due to excessive stress on the breathable component 242.

In some embodiments, the battery cell 20 provided in the embodiments of this application has a conductivity S of the electrolyte 25 greater than or equal to 8.5 ms/cm and less than or equal to 11 ms/cm. In other words, the conductivity S of the electrolyte 25 can be any value between 8.5 ms/cm and 11 ms/cm, including the two endpoint values of 8.5 ms/cm and 11 ms/cm.

The greater the conductivity S of the electrolyte 25, such as greater than 11 mS/cm, the larger the ratio of the conductivity of the electrolyte 25 to the specific gas containment space, reaching the design limit of the battery cell 20. Excessively high conductivity may lead to increased side reactions and higher costs. On the other hand, if the conductivity S of the electrolyte 25 is smaller, such as less than 8.5 mS/cm, the ratio of the conductivity S of the electrolyte 25 to the specific gas containment space V is smaller, causing a higher risk of insufficient charging capability and energy density of the battery cell 20.

Therefore, the battery cell 20 provided in the embodiments of this application can improve the charging capability of the battery cell 20 and reduce the probability of increased side reactions and higher costs by selecting the conductivity S of the electrolyte 25 within the aforementioned range.

As an optional implementation, the battery cell 20 provided in the embodiments of this application has a conductivity S of the electrolyte 25 greater than or equal to 9 mS/cm and less than or equal to 10 mS/cm. By choosing a high-conductivity fast-charging electrolyte 25, the charging capability of the battery cell 20 can be further improved, balancing side reactions and costs.

In some optional embodiments, the battery cell 20 provided in the embodiments of this application has a specific gas containment space V greater than or equal to 0.1 ml/Ah and less than or equal to 0.4 ml/Ah, which means that the specific gas containment space V can be any value between 0.1 ml/Ah and 0.4 ml/Ah.

The smaller the specific gas containment space V, such as less than 0.1 ml/Ah, the larger the ratio of the conductivity of the electrolyte 25 to the specific gas containment space, reaching the design limit of the battery cell 20. Excessively high conductivity may lead to increased side reactions and higher costs. On the other hand, if the specific gas containment space V is larger, such as greater than 0.4 ml/Ah, the ratio of the conductivity of the electrolyte 25 to the specific gas containment space is smaller, causing a higher risk of insufficient charging capability and energy density of the battery cell 20.

The battery cell 20 provided in the embodiments of this application can ensure high charging capability and reduce the risk of increased side reactions and higher costs by selecting the specific gas containment space V within the aforementioned range.

As an optional implementation, the specific gas containment space V is greater than or equal to 0.2 ml/Ah and less than or equal to 0.35 ml/Ah. Through this setting, the risk of increased side reactions and higher costs of the battery cell 20 can be further reduced while charging capability is ensured.

In some embodiments, the conductivity S of the electrolyte 25 and the specific gas containment space V further satisfy 20 mS*Ah/(ml*cm)<S/V<110 mS*Ah/(ml*cm). In other words, the ratio of the conductivity S of the electrolyte 25 and the specific gas containment space V can be any value between 20 mS*Ah/(ml*cm) and 110 mS*Ah/(ml*cm), including the two endpoint values of 20 mS*Ah/(ml*cm) and 110 mS*Ah/(ml*cm).

As mentioned earlier, if the ratio of the conductivity S of the electrolyte 25 to the specific gas containment space V is relatively small, such as less than 20 mS*Ah/(ml*cm), it cannot meet the requirements of high charging capability and high energy density. If the ratio of the conductivity S of the electrolyte 25 and the specific gas containment space V is relatively large, such as greater than 110 mS*Ah/(ml*cm), reaching the limit of the battery cell 20, the excessively high conductivity may lead to increased side reactions and higher costs.

The battery cell 20 provided in the embodiments of this application ensures an appropriate ratio of the conductivity S of the electrolyte 25 and the specific gas containment space V by making the ration satisfy 20 mS*Ah/(ml*cm)<S/V<110 mS*Ah/(ml*cm), which not only meets the high charging capability but also reduces the probability of side reactions occurring.

Specific examples are described below to illustrate the solution.

For preparation of the positive electrode plate of the electrolyte assembly 23, the positive electrode active material (NCM811), conductive carbon, and binder (PVDF) were mixed in a mass ratio of 97:1:1, solvent N-methylpyrrolidone (NMP) was added, and a stir was applied under vacuum until the system is uniform to obtain a positive electrode slurry. This slurry was applied evenly on a positive electrode current collector, which was transferred to an oven for drying, followed by cold pressing and cutting, to obtain a positive electrode plate. The positive electrode active material can be selected from lithium cobalt oxide, lithium nickel oxide, lithium manganese oxide, lithium nickel manganese oxide, lithium nickel cobalt manganese oxide, lithium nickel cobalt aluminum oxide, and the like, but is not limited to these materials, and other materials suitable for lithium-ion battery positive electrode active materials can also be used.

For preparation of the negative electrode plate, secondary particle carbonized product A of the negative electrode active material, conductive agent, CMC, and binder SBR were mixed in a mass ratio of 96.6:0.8:1.1:1.5, deionized water was added as a solvent, and a stir was applied evenly under vacuum to obtain a negative electrode slurry. The negative electrode slurry was applied evenly on a negative electrode current collector, dried in an oven, followed by cold pressing and cutting, to obtain a negative electrode plate.

For preparation of the separator, a polyethylene separator was used.

For preparation of the electrolyte 25, ethylene carbonate (EC), ethyl methyl carbonate (EMC), and diethyl carbonate (DEC) were mixed in a volume ratio of 1:1:1 to obtain an organic solvent. Next, thoroughly dried lithium salt $LiPF_6$ was dissolved in the mixed organic solvent to prepare an electrolyte 25 with a concentration of 1 mol/L.

For preparation of the battery cell 20, the above positive electrode plate, separator, and negative electrode plate were wound to produce an electrode assembly. The electrode assembly, with its surface wrapped with an insulating layer, was placed in a housing 22, and after drying, the prepared electrolyte 25 was injected. After formation, standing, and electrolyte replenishment steps, a lithium-ion battery was obtained.

As shown in FIG. 7, lithium-ion batteries of the examples and comparative examples were all prepared according to the method described above. The kinetic performance testing, gas generation during storage testing, and energy density testing of the battery cell 20 can be performed using the following methods.

For the kinetic performance testing, the batteries prepared in the examples and the comparative examples were tested at 25° C. by charging at 5C for Y1 minutes, 4.7C for Y2 minutes, and continuing until 1C charging for Yn minutes, followed by 1C full discharge, repeated 10 times. The batteries were then fully charged at 1C, disassembled, and the lithium precipitation on the electrode plates was observed. If no lithium precipitation is observed on the negative electrode plate surface, the charging time Y1 to Yn was adjusted until lithium precipitation occurs, and the test is stopped. The charging time used at this point was the maximum charging capability of the battery.

For the gas generation during storage testing, the gas-generating cell prepared was stored at 60° C. and 97% SOC. The gas pressure inside the housing 22 was monitored online, and when it reaches 0.35 MPa, the number of days elapsed was recorded.

For the energy density testing, at 25° C., the batteries prepared in the examples and the comparative examples were fully charged and discharged at 0.33C and 1C rates, respectively, and the actual discharge energy at that time was recorded. The battery electrode plates were weighed at 25° C. using an electronic balance. The ratio of the battery's actual 1C discharge energy to the weight of the battery electrode plates is the actual energy density of the battery. The energy density increase is calculated as (actual energy density−target energy density)/target energy density, with the target energy density as the reference.

From the kinetic performance testing, gas generation during storage testing, and energy density testing, as well as FIG. 7, it can be seen from Example 1 to Example 4 that with the increase in the conductivity S of the electrolyte 25, the fast charging capability also increases.

From Example 1 to Example 3, it can be seen that with the material and area of the breathable component 242 remaining constant, as the conductivity S of the electrolyte 25 increases, the specific gas containment space V decreases, leading to a reduction in the cycle count and storage days of the battery cell 20.

From Example 6 to Example 8, it can be seen that the breathable component 242 improves gas generation for active materials of both NCM811 and LFP systems, or low-silicon systems.

For comparative examples without a breathable top cover, adopting a conductivity of 11 and a residual space after injection of 0.1 in the design, the electrode assembly 23 generates a large amount of gas, leading to premature abrupt capacity drop.

Considering the kinetics, cycling, and lifetime of the battery cell 20, the optimal conductivity S of the electrolyte 25 is preferably 9 mS/cm-10 mS/cm, and the optimal specific gas containment space V is preferably 0.2 ml/Ah-0.4 ml/Ah.

By increasing the area of the breathable component 242 with high specific effective ventilating area, the storage days before the pressure reaches P=0.35 MPa or 80% SOC can be increased.

Figure 8:
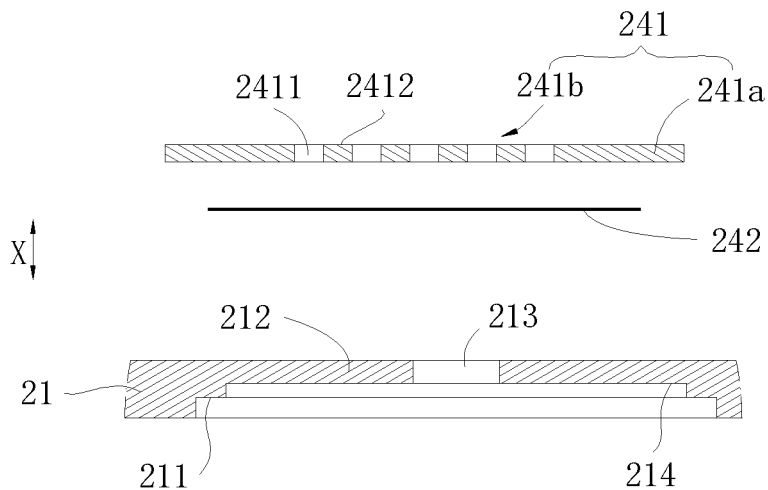
FIG. 8 is a performance analysis table of examples of the battery cell according to this application and comparative examples.
Figure 9:
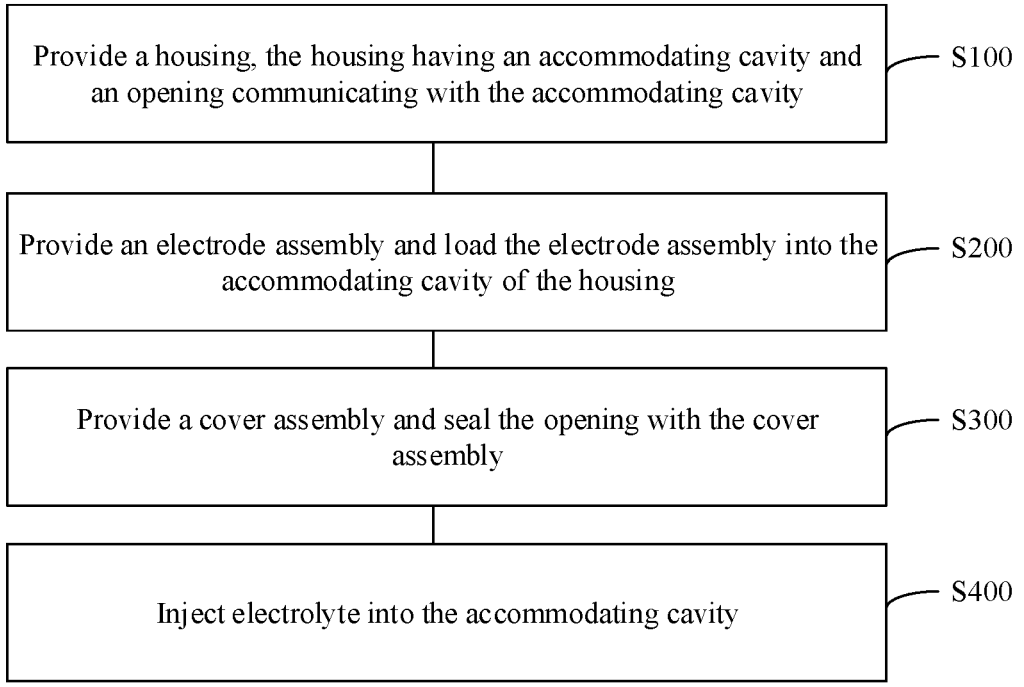
FIG. 9 is a flowchart of a manufacturing method of battery cell in some embodiments of this application.
Figure 10:
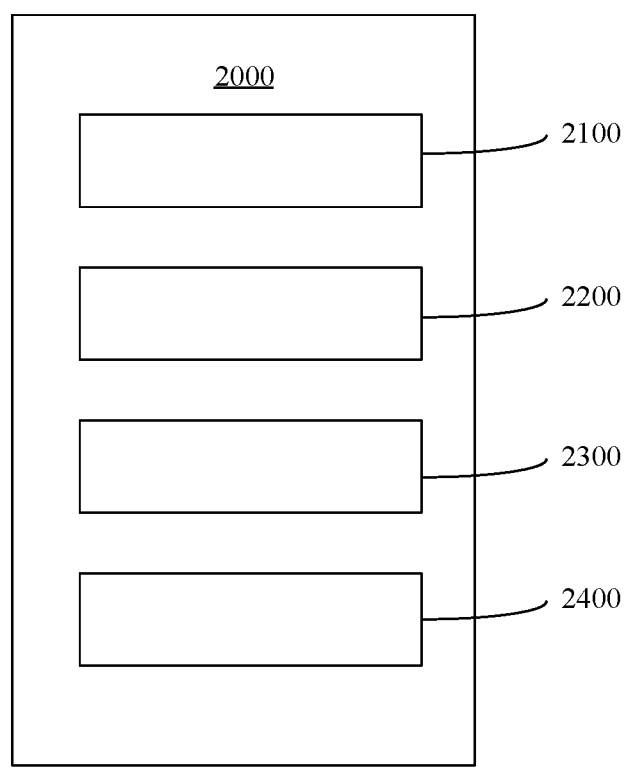
FIG. 10 is a schematic block diagram of manufacturing device of battery cell in some embodiments of this application.

Refer to FIG. 8. In some embodiments, the battery cell 20 provided by this application has a connecting component 241 with a plurality of first through holes 2411. A connecting portion 2412 is formed between two adjacent first through holes 2411, and the breathable component 242 covers the plurality of first through holes 2411. The connecting portion 2412 is configured to attach to the breathable component 242 to limit deformation of the breathable component 242. The breathable component 242 is configured to discharge gas through the plurality of first through holes 2411 to the outside of the casing when the gas pressure inside the battery cell 20 reaches the threshold.

The number of first through holes 2411 provided in the connecting component 241 can be two, three, or more, without any specific quantity limit in embodiment of this application.

The shape of the first through hole 2411 can be a regular geometric shape, such as a circle, ellipse, or regular polygon. It can also be an irregular geometric shape, without any specific shape limitation in this application, as long as it can meet the gas discharge requirements of the battery cell 20.

The shapes of the individual first through holes 2411 among the plurality of first through holes 2411 can be the same, such as all being circular, elliptical, or oval. Alternatively, the shapes of the first through holes 2411 among the plurality of first through holes 2411 can be different, or at least part of the first through holes 2411 can have different shapes, for example, some of the first through holes 2411 can be circular, while others can be elliptical, oval, or polygonal.

The first through hole 2411 can be formed in various ways, such as stamping and milling, without any specific limitations in embodiments of this application.

There is no specific limitation on the distribution pattern of the plurality of first through holes 2411 on the connecting component 241. For example, they can be arranged in rows and columns or arrayed, distributed along a circular track, or distributed along a straight or curved track.

At least part of the hole walls between two adjacent first through holes 2411 are spaced apart, and the connecting portion 2412 is a region of the connecting component 241 between two adjacent first through holes 2411. In any direction perpendicular to the axial direction of the first through hole 2411, a connecting portion 2412 can be formed between each pair of adjacent first through holes 2411.

The connecting portion 2412 is attached to the breathable component 242, which can contact and abut the connecting portion 2412. The connection between the breathable component 242 and the connecting portion 2412 can be achieved by adhesive bonding or chemical bonding. The deformation of the breathable component 242 can be a shape change caused by bulging at least partially away from the electrode assembly 23.

In the above technical solution, the connecting component 241 is provided with a plurality of first through holes 2411, and the breathable component 242 covers the plurality of first through holes 2411. When the gas pressure inside the battery cell 20 reaches the threshold, the gas is discharged to the outside of the battery cell 20 through the breathable component 242 and the plurality of first through holes 2411, thereby achieving the purpose of discharging the internal gas of the battery cell 20. Since the connecting component 241 includes the connecting portion 2412 formed between two adjacent first through holes 2411, the connecting component 241 can be attached to the breathable component 242 through the connecting portion 2412. When the internal gas of the battery cell 20 acts on the breathable component 242 during the process of discharging through the breathable component 242 to the outside of the battery cell 20, the connecting portion 2412 can provide a counteracting force against the internal pressure of the battery cell 20 to the breathable component 242, reducing the deformation of the breathable component 242, enhancing the overall pressure resistance of the exhaust mechanism, and thereby improving the safety of the battery cell 20.

In some optional embodiments, the breathable component 242 is disposed on a side of the connecting component 241 facing the electrode assembly 23, and the connecting portion 2412 is configured to provide support force to the breathable component 242 when the breathable component 242 deforms towards the outside of the battery cell 20.

The side of the connecting component 241 facing the inside of the battery cell 20 can be the side of the connecting component 241 facing the inside of the electrode assembly 23 along the axial direction X of the first through hole 2411. The connecting portion 2412 can provide support force to the breathable component 242 along the axial direction X of the first through hole 2411 when the breathable component 242 deforms towards the outside of the battery cell 20, limiting the deformation of the breathable component 242.

With the breathable component 242 positioned on the side of the connecting component 241 facing the inside of the battery cell 20, during an exhaust process, the connecting component 241 can provide support force to the breathable component 242, ensuring sufficient exhaust area while avoiding excessive internal pressure in the battery cell 20 causing deformation or displacement of the breathable component 242, thus ensuring the integrity of the breathable component 242 and improving safety. Moreover, with the breathable component 242 positioned on the side of the connecting component 241 facing the inside of the battery cell 20, this arrangement can improve the utilization of the external space of the end cover, facilitating inkjet printing or implementing more functions.

In some embodiments, the shapes and areas of the plurality of first through holes 2411 are the same. The shapes of the plurality of first through holes 2411 can be the same, for example, all being circular holes. Of course, the plurality of first through holes 2411 can instead be elliptical holes or polygonal holes, optionally being regular polygonal holes. The same area of the plurality of first through holes 2411 means that the areas of any two first through holes 2411 are the same. For example, when all the first through holes 2411 are circular holes, the diameters of any two first through holes 2411 are the same; when all the first through holes 2411 are elliptical holes, the long-axis dimensions of any two first through holes 2411 are equal, and the short-axis dimensions thereof are also equal.

Making the shapes and areas of the plurality of first through holes 2411 the same is conducive to the uniform and rapid passage of gas through the plurality of first through holes 2411 during the exhaust process. This ensures that the breathable component 242 experiences the same gas pressure in corresponding parts, avoiding deformation of the breathable component 242 due to uneven gas distribution through the plurality of first through holes 2411. Meanwhile, the plurality of first through holes 2411 can be processed by stamping or milling methods. By making the shapes and areas of the plurality of first through holes 2411 the same, the same processing steps can be used for each first through hole 2411, simplifying the processing steps, reducing machining costs, and improving molding efficiency.

In some embodiments, the shape of the first through hole 2411 can be one of the following: circular, elliptical, oval, or polygonal.

The shape of the first through hole 2411 can be one of the following in its axial direction X projection: circular, elliptical, oval, or polygonal. The shapes of all first through holes 2411 can be one of circular, elliptical, oval, or polygonal.

With the above configuration, during the exhaust process of the battery cell 20, not only the exhaust efficiency is ensured, but also the first through holes 2411 are given a regular or approximately regular geometric shape, which is conducive to the processing and molding of the first through holes 2411.

In some embodiments, in the axial direction X of the first through holes 2411, the sum of the orthographically projected areas S1 of the first through holes 2411 and the projected area S2 of the breathable component 242 satisfy: $S1/S2 \leq 0.8$.

The orthographically projected area of each first through hole 2411 in its axial direction X is the area enclosed by an orthographic projection contour of the hole wall of that first through hole 2411 along the axial direction X. For example, when the first through hole 2411 is a circular hole, its orthographic projection in the axial direction X is circular, and the projected area of the first through hole 2411 is the area within the circle. When the orthographic projection of the first through hole 2411 in the axial direction X is a polygon, the orthographically projected area of the first through hole 2411 is the area within the polygon.

In some embodiments, the casing and the exhaust mechanism 24 are provided separately, and the exhaust mechanism 24 is connected to the casing through the connecting component 241.

Providing the casing and the exhaust mechanism 24 separately means that the casing and the exhaust mechanism 24 are two independent components before assembly, produced separately. When assembled together, the exhaust mechanism 24 is connected to the casing through the connecting component 241.

With the above configuration, the casing and the exhaust mechanism 24 are independent components, facilitating processing and assembly. Additionally, the separate molding method allows the casing and the exhaust mechanism 24 to be made from different materials and processed separately. Suitable materials and processing techniques can be selected based on the structural characteristics and usage requirements of the exhaust mechanism 24.

In some embodiments, the casing has a first recess 211, the first recess 211 being configured to accommodate at least part of the exhaust mechanism 24.

The first recess 211 is formed by removing a portion of the material from the casing. In the axial direction of the first through hole 2411, the bottom wall thickness of the first recess 211 is smaller than the thickness of the casing in other corresponding areas. When the exhaust mechanism 24 is used for the battery cell 20, the first recess 211 can be arranged facing the electrode assembly 23 or facing away from the electrode assembly 23.

In the axial direction of the first through hole 2411, the orthographic projection shape of the first recess 211 can be circular, elliptical, polygonal, or the like. This application does not specifically limit the shape.

The exhaust mechanism 24 can be partially located within the first recess 211, or the exhaust mechanism 24 can be entirely located within the first recess 211. When the exhaust mechanism 24 is entirely located within the first recess 211, in the axial direction X of the first through hole 2411, the side of the exhaust mechanism 24 that faces away from the bottom wall of the first recess 211 can be flush with the casing.

By providing a first recess 211 in the casing and accommodating at least part of the exhaust mechanism 24 within the first recess 211, the overall occupied space of the exhaust mechanism can be reduced. Moreover, the provision of the first recess 211 can help position the installation of the exhaust mechanism 24, reducing the assembly difficulty between the exhaust mechanism 24 and the casing.

In some embodiments, the connecting component 241 includes a main body region 241a and an exhaust region 241b. The main body region 241a is configured to connect the casing, and the exhaust region 241b includes the connecting portion 2412 and the plurality of first through holes 2411. One part of the breathable component 242 is attached to the main body region 241a, and another part thereof is attached to the connecting portion 2412 of the exhaust region 241b. The casing has a shielding portion 212 and a second through hole 213 at the bottom of the first recess 211. The shielding portion 212 is configured to shield at least part of the exhaust region 241b, and the second through hole 213 is configured to communicate with a space defined by the first recess 211.

The main body region 241a and the exhaust region 241b of the connecting component 241 can be an integrated structure or separate structures. Optionally, an integrated structure is used which can ensure the connection strength between the two and facilitate the molding of the connecting component 241.

The main body region 241a of the connecting component 241 can be arranged around the exhaust region 241b. The outer periphery of the main body region 241a can be connected to the casing, optionally using welding or other methods to secure the connection with the casing.

The plurality of first through holes 2411 and the connecting portion 2412 are both located in the exhaust region 241b. The breathable component 242 is attached to both the connecting portion 2412 of the exhaust region 241b and the main body region 241a.

The first recess 211 includes a bottom and a sidewall surrounding the bottom. The shielding portion 212 is located at the bottom of the first recess 211, and the second through hole 213 can be arranged to penetrate through the bottom of the first recess 211 in the axial direction of the first through hole 2411.

The number of second through holes 213 can be one or more, and the diameter of the second through hole 213 can be equal to or different from the diameter of the first through hole 2411. Optionally, the diameter of the second through hole 213 can be larger than the diameter of any of the first through holes 2411.

In the axial direction of the first through hole 2411, the position of the second through hole 213 can be arranged opposite the first through hole 2411. Of course, in some embodiments, the two can instead be arranged in a staggered manner in the axial direction of the first through hole 2411.

By specifying that the connecting component 241 includes a main body region 241a and an exhaust region 241b, the connecting component 241 can be connected to the casing through the main body region 241a, ensuring the connection strength between the connecting component 241 and the casing. The gas inside the battery cell 20 can be exhausted through the exhaust region 241b, ensuring the safety performance of the battery cell 20. Since one part of the breathable component 242 is attached to the main body region 241a and another part thereof is attached to the exhaust region 241b, that is, the breathable component 242 is not only attached to the connecting portion 2412 but also attached to the main body region 241a, the attachment strength between the breathable component 242 and the connecting component 241 can be ensured, reducing the risk of separation between the breathable component 242 and the connecting component 241. The shielding portion 212 is configured to shield at least part of the exhaust region 241b, and with the shielding portion 212, at least some foreign matter can be prevented from entering the plurality of first through holes 2411, thus avoiding the impact on the breathable component 242 and ensuring the performance of the breathable component 242. The second through hole 213 is configured to communicate with the space defined by the first recess 211, allowing the gas inside the battery cell 20 to be discharged, ensuring the safety of the battery cell 20.

In some embodiments, the shielding portion 212 has a second recess 214. The second recess 214 recedes from the bottom surface of the first recess 211 in a direction leaving the breathable component 242. A clearance space is formed between the bottom surface of the second recess 214 and the exhaust mechanism 24 to make clearance for the exhaust region 241b.

The projection shape of the second recess 214 in the axial direction of the first through hole 2411 can be various, such as circular, elliptical, or polygonal. Optionally, in the axial direction of the first through hole 2411, the projected area of the second recess 214 is smaller than the projected area of the first recess 211. Optionally, the projection of the second recess 214 is located within the projection of the first recess 211.

The second through hole 213 can extend from the bottom surface of the second recess 214 along the axial direction of the first through hole 2411 and penetrate the casing. In the axial direction of the first through hole 2411, the bottom surface of the second recess 214 is spaced apart from the exhaust mechanism 24 and forms a clearance space.

By providing a second recess 214 in the shielding portion 212 and forming a clearance space between the bottom surface of the second recess 214 and the exhaust mechanism 24, when at least part of the orthographic projections of the first through holes 2411 in the axial direction are covered by the shielding portion 212, contact between the shielding portion 212 and the exhaust region 241b of the connecting component 241 can be avoided, preventing the shielding portion 212 from sealing the covered first through holes 2411, ensuring the exhaust requirements of the battery cell 20, and improving the safety performance of the battery cell 20.

In some embodiments, the first recess 211 recedes from the inner surface of the casing in the direction leaving the electrode assembly 23, the shielding portion 212 is located on the side of the exhaust mechanism 24 facing away from the electrode assembly 23, and the second through hole 213 is configured to communicate the external space of the battery cell 20 with the first recess 211.

In the above technical solution, the first recess 211 recedes from the inner surface of the casing in the direction leaving the inside of the battery cell 20, the shielding portion 212 is located on the side of the exhaust mechanism 24 facing away from the inside of the battery cell 20, and the second through hole 213 is configured to communicate the external space of the battery cell 20 with the first recess 211, allowing the gas inside the battery cell 20 to pass through the breathable structure successively through the second through hole 213 and the first through hole 2411 and be discharged. The position of the shielding portion 212 can effectively block external foreign matter from entering the first through hole 2411, reducing the risk of damage to the breathable component 242.

The battery cell 20 provided in the embodiments of this application can be referred to for dynamic performance testing, storage life testing, capacity density testing, and energy density testing.

In another aspect, embodiments of this application also provide a battery, which includes the aforementioned battery cell 20.

In yet another aspect, embodiments of this application provide an electric apparatus, which includes the aforementioned battery, the battery being configured to provide electrical energy.

Embodiments of this application provide a battery including the battery cell 20 provided in any of the aforementioned embodiments, with a box configured to accommodate the battery cell 20.

Embodiments of this application provide an electric apparatus including the battery provided in any of the aforementioned embodiments, the battery being configured to provide electrical energy.

In still another aspect, embodiments of this application provide a manufacturing method of battery cell 20, including:
- S100: providing a housing 22, the housing 22 having an accommodating cavity and an opening communicating with the accommodating cavity;
- S200: providing an electrode assembly 23 and loading the electrode assembly 23 into the accommodating cavity of the housing 22;
- S300: providing a cover assembly 21 and sealing the opening with the cover assembly 21, where the cover assembly 21 and the housing 22 jointly form a casing, the casing is provided with an exhaust mechanism 24, the exhaust mechanism 24 includes a connecting component 241 and a breathable component 242, the connecting component 241 is configured to connect the casing, and the breathable component 242 is configured to discharge gas to outside of the casing when gas pressure inside the casing reaches a threshold; and
- S400: injecting electrolyte 25 into the accommodating cavity so that specific effective ventilating area A of the breathable component 242, conductivity S of the electrolyte 25, and specific gas containment space V satisfy $20 \text{ mm}^2 \text{*mS/cm*ml} < AS/V < 165 \text{ mm}^2 \text{*mS/cm*ml}$, where the specific gas containment space V is a ratio of a remaining value of volume of the accommodating cavity minus volume of the electrolyte 25 and volume of the electrode assembly 23 to capacity of the electrode assembly 23.

The manufacturing method of battery cell 20 provided in the embodiments of this application can be used to prepare the battery cell 20 provided in the various embodiments above. The prepared battery cell 20, provided with the exhaust mechanism 24, allows gas to be discharged to the outside of the casing when the gas pressure inside the casing reaches the threshold. Furthermore, as the specific effective ventilating area A of the breathable component 242, the conductivity S of the electrolyte 25, and the specific gas containment space V are specified to satisfy 20 mm$^2$*mS/cm*ml<AS/V<165 mm$^2$*mS/cm*ml, where the specific gas containment space V is the ratio of the remaining value of the volume of the accommodating cavity minus the volume of the electrolyte 25 and the volume of the electrode assembly 23 to the capacity of the electrode assembly 23, the conductivity of the electrolyte 25 is improved compared to existing battery cells 20. This allows for rapid ion migration and enhances the overall charging capability of the battery cell, while also ensuring that the gas generated during the fast-charging process can be timely discharged from the breathable component 242 of the exhaust mechanism 24, improving safety performance.

In yet still another aspect, embodiments of this application also provide a manufacturing device 2000 of battery cell 20, including:

a first assembly apparatus 2100, configured to provide a housing 22, the housing 22 having an accommodating cavity and an opening communicating with the accommodating cavity;

a second assembly apparatus 2200, configured to provide an electrode assembly 23 and load the electrode assembly 23 into the accommodating cavity of the housing 22;

a third assembly apparatus 2300, configured to provide a cover assembly 21 and seal the opening with the cover assembly 21, where the cover assembly 21 and the housing 22 jointly form a casing, the casing is provided with an exhaust mechanism 24, the exhaust mechanism 24 includes a connecting component 241 and a breathable component 242, the connecting component 241 is configured to connect the casing, and the breathable component 242 is configured to discharge gas to outside of the casing when gas pressure inside the casing reaches a threshold; and an injection apparatus 2400, configured to inject electrolyte 25 into the casing so that specific effective ventilating area A of the breathable component 242, conductivity S of the electrolyte 25, and specific gas containment space V satisfy 20 mm$^2$*mS/cm*ml<AS/V<165 mm$^2$*mS/cm*ml, where the specific gas containment space V is a ratio of a remaining value of volume of the accommodating cavity minus volume of the electrolyte 25 and volume of the electrode assembly 23 to capacity of the electrode assembly 23.

The manufacturing device of battery cell 20 provided in the embodiments of this application can be used to prepare the battery cell 20 provided in the various embodiments above. The prepared battery cell 20, provided with the exhaust mechanism 24, allows gas to be discharged to the outside of the casing when the gas pressure inside the casing reaches the threshold. Furthermore, as the specific effective ventilating area A of the breathable component 242, the conductivity S of the electrolyte 25, and the specific gas containment space V are specified to satisfy 20 mm$^2$*mS/cm*ml<AS/V<165 mm$^2$*mS/cm*ml, where the specific gas containment space V is the ratio of the remaining value of the volume of the accommodating cavity minus the volume of the electrolyte 25 and the volume of the electrode assembly 23 to the capacity of the electrode assembly 23, the conductivity of the electrolyte 25 is improved compared to existing battery cells 20. This allows for rapid ion migration and enhances the overall charging capability of the battery cell, while also ensuring that the gas generated during the fast-charging process can be timely discharged from the breathable component 242 of the exhaust mechanism 24, improving safety performance.

It should be noted that, without conflict, the embodiments and features in the embodiments of this application may be combined with each other.

The above embodiments are merely intended to illustrate the technical solutions of this application and are not intended to limit this application. For those skilled in the art, various changes and modifications can be made to this application. Any modifications, equivalent replacements, and improvements made within the spirit and principles of this application should be included within the scope of protection of this application.

The invention claimed is:

1. A battery cell, comprising:
   an electrode assembly;
   a casing having an accommodating cavity for accommodating the electrode assembly;
   an exhaust mechanism disposed on the casing, the exhaust mechanism comprising a connecting component and a breathable component, wherein the connecting component is configured to connect the casing, and the breathable component is configured to discharge gas to outside of the casing when gas pressure inside the casing reaches a threshold; and
   an electrolyte filled in the casing;
   wherein specific effective ventilating area A of the breathable component, conductivity S of the electrolyte, and specific gas containment space V satisfy 20 mm$^2$*mS/cm*ml<AS/V<165 mm$^2$*mS/cm*ml, in which the specific gas containment space V is equal to a ratio of a remaining value of volume of the accommodating cavity minus volume of the electrolyte and volume of the electrode assembly to capacity of the electrode assembly, and the specific effective ventilating area A of the breathable component is a ratio of an effective ventilating area of the breathable component to the capacity of the electrode assembly,
   wherein the specific effective ventilating area A of the breathable component is greater than or equal to 0.15 mm$^2$/Ah and less than or equal to 1.5 mm$^2$/Ah;
   wherein the conductivity S of the electrolyte is greater than or equal to 8.5 mS/cm and less than or equal to 11 mS/cm; and
   wherein the specific gas containment space V is greater than or equal to 0.1 ml/Ah and less than or equal to 0.4 ml/Ah.

2. The battery cell according to claim 1, wherein the specific effective ventilating area A of the breathable component, the conductivity S of the electrolyte, and the gas containment space V satisfy: 30 mm$^2$*mS/cm*ml<AS/V<90 mm$^2$*mS/cm*ml.

3. The battery cell according to claim 1, wherein the specific effective ventilating area A of the breathable component is greater than or equal to 0.45 mm$^2$/Ah and less than or equal to 0.9 mm$^2$/Ah.

4. The battery cell according to claim 1, wherein the conductivity S of the electrolyte is greater than or equal to 9 mS/cm and less than or equal to 10 mS/cm.

5. The battery cell according to claim 1, wherein the gas containment space V is greater than or equal to 0.2 ml/Ah and less than or equal to 0.35 ml/Ah.

6. The battery cell according to claim 1, wherein the conductivity S of the electrolyte and the specific gas containment space V further satisfy: 20 mS*Ah/(ml*cm)<S/V<110 mS*Ah(ml*cm).

7. The battery cell according to claim 1, wherein the connecting component has multiple first through holes, with a connecting portion being formed between two adjacent first through holes, the breathable component covers the plurality of first through holes, the connecting portion is configured to attach to the breathable component to limit deformation of the breathable component, the breathable component is configured to discharge gas through the plurality of first through holes to the outside of the battery cell when the gas pressure inside the battery cell reaches the threshold.

8. The battery cell according to claim 7, wherein the breathable component is disposed on a side of the connecting component facing the electrode assembly, and the connecting portion is configured to provide support force to the breathable component when the breathable component deforms toward the outside of the battery cell.

9. The battery cell according to claim 7, wherein the casing and the exhaust mechanism are provided separately, and the exhaust mechanism is connected to the casing through the connecting component.

10. The battery cell according to claim 9, wherein the casing has a first recess, the first recess being configured to accommodate at least part of the exhaust mechanism.

11. The battery cell according to claim 10, wherein the connecting component comprises a main body region and an exhaust region, the main body region being configured to connect the casing, the exhaust region comprising the connecting portion and the plurality of first through holes, wherein one part of the breathable component is attached to the main body region, and another part thereof is attached to the connecting portion of the exhaust region; and
  the casing has a shielding portion and a second through hole at the bottom of the first recess, the shielding portion being configured to shield at least part of the exhaust region, and the second through hole being configured to communicate with a space defined by the first recess.

12. The battery cell according to claim 11, wherein the shielding portion has a second recess, the second recess recedes from the bottom surface of the first recess in a direction leaving the breathable component, and a clearance space is formed between the bottom surface of the second recess and the exhaust mechanism to allow clearance for the exhaust region.

13. The battery cell according to claim 12, wherein the first recess recedes from the inner surface of the casing in a direction leaving the electrode assembly, the shielding portion is located on a side of the exhaust mechanism facing away from the electrode assembly, and the second through hole is configured to communicate the external space of the battery cell with the first recess.

14. The battery cell according to claim 1, wherein the casing comprises a housing and a cover assembly, the housing has an opening, and the cover assembly closes the opening, one of the housing and the cover assembly being provided with the exhaust mechanism.

15. A battery, comprising the battery cell according to claim 1.

16. An electric apparatus, comprising the battery according to claim 15, the battery being configured to provide electrical energy.

17. A method for manufacturing a battery cell, comprising:
  providing a housing, the housing having an accommodating cavity and an opening communicating with the accommodating cavity;
  providing an electrode assembly and loading the electrode assembly into the accommodating cavity of the housing;
  providing a cover assembly and sealing the opening with the cover assembly, wherein the cover assembly and the housing together form a casing, the casing is provided with an exhaust mechanism, the exhaust mechanism comprises a connecting component and a breathable component, the connecting component is configured to connect the casing, the breathable component is configured to discharge gas to outside of the casing when gas pressure inside the casing reaches a threshold; and
  injecting an electrolyte into the accommodating cavity so that specific effective ventilating area A of the breathable component, conductivity S of the electrolyte, and specific gas containment space V satisfy 20 mm$^2$*mS/cm*ml<AS/V<165 mm$^2$*mS/cm*ml, in which the specific gas containment space V is equal to a ratio of a remaining value of volume of the accommodating cavity minus volume of the electrolyte and volume of the electrode assembly to capacity of the electrode assembly, and the specific effective ventilating area A of the breathable component is a ratio of an effective ventilating area of the breathable component to the capacity of the electrode assembly,
  wherein the specific effective ventilating area A of the breathable component is greater than or equal to 0.15 mm$^2$/Ah and less than or equal to 1.5 mm$^2$/Ah;
  wherein the conductivity S of the electrolyte is greater than or equal to 8.5 mS/cm and less than or equal to 11 mS/cm; and
  wherein the specific gas containment space V is greater than or equal to 0.1 ml/Ah and less than or equal to 0.4 ml/Ah.

18. A manufacturing device of battery cell according to claim 1, comprising:
  a first assembly apparatus, configured to provide a housing, the housing having an accommodating cavity and an opening communicating with the accommodating cavity;
  a second assembly apparatus, configured to provide an electrode assembly and load the electrode assembly into the accommodating cavity of the housing;
  a third assembly apparatus, configured to provide a cover assembly and seal the opening with the cover assembly, wherein the cover assembly and the housing together form a casing, the casing is provided with an exhaust mechanism, the exhaust mechanism comprises a connecting component and a breathable component, the connecting component is configure to connect the casing, the breathable component is configured to discharge gas to outside of the casing when gas pressure inside the casing reaches a threshold; and an injection apparatus, configured to inject an electrolyte into the casing so that specific effective ventilating area A of the breathable component, conductivity S of the electrolyte, and specific gas containment space V satisfy 20 mm²*mS/cm*ml<AS/V<165 mm²*mS/cm*ml, in which the specific gas containment space V is equal to a ratio of a remaining value of volume of the accommodating cavity minus volume of the electrolyte and volume of the electrode assembly to capacity of the electrode assembly, and the specific effective ventilating area A of the breathable component is a ratio of an effective ventilating area of the breathable component to the capacity of the electrode assembly, wherein the specific effective ventilating area A of the breathable component is greater than or equal to 0.15 mm²/Ah and less than or equal to 1.5 mm²/Ah;

wherein the conductivity S of the electrolyte is greater than or equal to 8.5 mS/cm and less than or equal to 11 mS/cm; and wherein the specific gas containment space V is greater than or equal to 0.1 ml/Ah and less than or equal to 0.4 ml/Ah.

19. The battery cell according to claim 1, wherein the specific effective ventilating area A of the breathable component, the conductivity S of the electrolyte, and the specific gas containment space V satisfy: 30 mm²*mS/cm*ml<AS/V<45 mm²*mS/cm*ml.

* * * * *